United States Patent Office 3,531,454
Patented Sept. 29, 1970

3,531,454
PROCESS FOR PRODUCING VINYL
CHLORIDE POLYMER RESINS
Iko Ito, Mutuo Goto and Hachizo Tamai, Niihama-shi,
Japan, assignor to Sumitomo Chemical Company, Ltd.,
Osaka, Japan, a corporation of Japan
No Drawing. Filed July 1, 1968, Ser. No. 741,345
Claims priority, application Japan, July 7, 1967,
42/43,885
Int. Cl. C08f 1/13, 3/30
U.S. Cl. 260—92.8    6 Claims

ABSTRACT OF THE DISCLOSURE

An improvement in an air release property of a paste of vinyl chloride polymer resin by conducting emulsion polymerization of monomers of vinyl chloride or vinyl chloride with other ethylenically unsaturated compounds in the presence of 0.1 to 1% by weight, based on the monomer, of an alkali metal or ammonium salt of branched chain alkyl sulfate as a polymerization emulsifier.

The emulsifier is, for example, sodium 2,4,6,8-tetramethylnonyl sulfate, sodium β-2,4,6,8-tetramethylnonyloxyethyl sulfate, sodium 2,4,6-trimethylheptyl sulfate, ammonium 2,4,6-trimethylheptyl sulfate or ammonium β-2,4,6,8-tetramethylnonyloxyethyl sulfate.

The emulsifier may be used as a post polymerization emulsifier in an amount of 0.1 to 2.0% by weight based on the polymer, or used simultaneously as both polymerization emulsifier and post polymerization emulsifier in said amounts respectively.

This invention relates to a process for preparing a vinyl chloride polymer resin for paste, more particularly, a process for preparing a vinyl chloride polymer resin capable of forming a paste having a good air release property when used as a plastisol or organosol.

Generally in preparing a paste of vinyl chloride polymer resin, a vinyl chloride polymer resin for paste, plasticizer, diluent, stabilizer, etc. are mixed together and prepared into a paste by a proper means. The vinyl chloride polymer resin for paste is usually prepared by an emulsion polymerization, and such an anionic surfactant as alkali metal salt or ammonium salt of non-branched straight alkyl sulfuric acid of alkylaryl sulfonic acid, and of dialkyl sulfosuccinic acid, is usually used as an emulsifier in the polymerization. The emulsifier used in the polymerization will be hereinafter referred to as "a polymerization emulsifier."

A latex of vinyl chloride polymer obtained by such emulsion polymerization is successively dried by spray drying, etc. To impart a mechanical stability to the latex, a proper amount of an anionic surfactant selected from said group is sometimes added to the latex of vinyl chloride polymer prior to the drying. To lower a viscosity of sol prepared from the thus obtained resin, a proper amount of such a non-ionic surfactant as polyoxyethylenealkylether, polyoxyethylenearylether, glycerine monoalkylate, sorbitan mono- or polyalkylate, or polyoxyethylenesorbitan mono- or polyalkylate, is sometimes added thereto, if required. The emulsifier to be added prior to the drying will be hereinafter referred to as "a post polymerization emulsifier."

In preparing the paste, however, it is very difficult to prepare the paste without containing air foams in the paste, and when the paste containing the air foams is used as it is, the transparency of the article prepared by using the paste is considerably deteriorated, and the surface of the film casted from the paste becomes a pear-like skin, resulting in considerably poor appearance of the product. Thus, it is a common practice to remove the air foams from the paste of vinyl chloride polymer resin by evacuation prior to the application of paste. However, such operation requires considerable time and labor and is very disadvantageous in a process for preparing the paste of polyvinyl chloride.

The object of the present invention is to eliminate such disadvantage of the conventional process and to provide an improvement in a process for preparing a vinyl chloride polymer resin for paste which can produce a paste of vinyl chloride polymer resin capable of readily releasing air foams from the paste by leaving the paste standing.

The present invention provides an improvement in a process for preparing a vinyl chloride polymer resin by emulsion-polymerizing monomer of vinyl chloride or vinyl chloride with other ethylenically unsaturated compounds in the presence of a polymerization emulsifier in a polymerization step, mixing a latex of the resulting polymer with post polymerization emulsifier in a mixing step, and drying the thus mixed latex, which comprises using an alkali metal salt or ammonium salt of alkyl sulfuric acid as represented by the following formula,

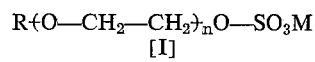

[I]

wherein M is a member selected from the group consisting of alkali metal and ammonium group, R is an alkyl group having 7 to 20 carbon atoms which does not contain adjacent 4 or more methylene groups, and $n$ is an integer of 0 to 2, as an emulsifier in at least one step of the polymerization step or the mixing step.

The emulsifier as represented by the above Formula I is characteristic of a structure of branched alkyl group as shown by R. The aliphatic alcohol having an alkyl group of such a structure can be readily prepared at a low cost by a homo or cooligomerization of lower olefins, for example, as represented by the following formula, through the formation of higher α-olefin,

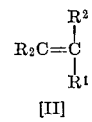

[II]

wherein $R^1$ is an alkyl group having no adjacent 4 or more methylene groups or hydrogen, $R^2$ is an alkyl group having no adjacent 4 or more methylene groups and the number of the total carbon atoms of lower olefin as represented by the above Formula II is 7 or less [refer to Ann. der. Chemie 629, 241–250 (1960)].

The emulsifier used in the present invention is a known compound, but has not usually been used heretofore as an emulsifier for the emulsion polymerization of vinyl chloride, or as a post polymerization emulsifier for preparing a paste of the vinyl chloride polymer resin.

The emulsifiers used in the present invention and shown by the above Formula I include, for example, alkali metal salts and ammonium salts of alkyl sulfuric acids having such alkyl groups as 2,4-dimethylpentyl, 2,4,6-trimethylheptyl, 2,4,6,8-tetramethylnonyl, 2,4,6,8,10-pentamethylundecanyl, 2,2,4,4-tetramethylpentyl, 2,2,4,4,6,6-hexamethylheptyl, 2,2,4,4,6,6,8,8-octamethylnonyl, and the like or any other alkyl group derived by the isomerization of said alkyl groups, and β-alkoxyethyl sulfuric acids or β-(β-alkoxyethoxy)ethyl sulfuric acids, wherein the alkyl of the alkoxy is as above exemplified group. Sodium and potassium are preferable as the alkali metal.

When the present emulsifier is used as both of polymerization emulsifier, it is not necessary to use the same emulsifier. In other words, different emulsifiers may be used for each one.

The present emulsifiers can be used as a polymerization emulsifier for the emulsion polymerization of vinyl chloride or post polymerization emulsifier or both of them, without any trouble in quite the same manner as with conventional emulsifiers of salts of non-branched straight alkyl sulfuric acids, which has the same total carbon atoms as those of the present emulsifier.

As a polymerization emulsifier, 0.1 to 1.0% by weight of the present emulsifier is usually preferably used on the basis of vinyl chloride monomer, and as a post polymerization emulsifier 0.1 to 2.0% by weight of the present emulsifier is usually preferably used on the basis of vinyl chloride polymer. The ordinary nonionic surfactant may be used as a post polymerization emulsifier together with the present emulsifier. In case the ordinary surfactant is used together with the present emulsifier, the amount of the ordinary surfactant is 0.1 to 2.0% by weight on the basis of vinyl chloride polymer.

As a polymerization method for carrying out the present invention, a conventional emulsion polymerization process for preparing a vinyl chloride polymer for paste is employed. Naturally, seeds may be used or the emulsifier may be added intermittently in carrying out the emulsion of polymerization.

As a polymerization catalyst, the ordinary catalysts used in the emulsion polymerization, for example, a water-soluble radical initiator such as hydrogen peroxide, potassium persulfate, etc. alone or a redox catalyst combined organic or inorganic reducing agent such as $l$-ascorbic acid, rongalite, ferrous sulfate, and cupric sulfate with the said initiator, are used.

When the present emulsifier is used only in the polymerization, the conventionally well-known post polymerization emulsifier is used in an ordinary amount. On the contrary, when the preset emulsifier is used only as a post polymerization emulsifier, the conventionally well-known polymerization emulsifier is used in an ordinary amount.

The polymerization temperature is usually in a range of 30° to 70° C. as in the ordinary polymerization of vinyl chloride.

A polyvinyl chloride latex obtained according to the process of the present invention is mixed with a fixed amount of a post polymerization emulsifier and the resultant mixture is dried by such a drying method as a spray drying method. The dried mixture is pulverized and thereto a desired plasticizer or stabilizer is added and the resultant mixture is kneaded according to a conventional method to obtain a paste resin of polyvinyl chloride.

The present inventin is applicable not only to homo polymerization of vinyl chloride, but also to preparation of a copolymer of vinyl chloride with other ethylenically unsaturated compound. The ethylenically unsaturated compounds include vinylidene chloride, vinyl esters, for example, vinyl acetate, acrylic acid and its derivatives, acrylonitrile, and styrene.

A paste resin produced from a polyvinyl chloride obtained according to the process of the present invention is remarkably superior to a polyvinyl chloride paste resin produced by a conventional process in an air release property.

The present invention is explained in detail, referring to examples. However, the present invention is not limited to those particular examples.

EXAMPLE 1

Into a 100 l. glass lining autoclave were charged 40 kg. of demineralized water and 1.79 kg. of vinyl chloride seed polymer latex as a polymer. The autoclave was caused and flushed with nitrogen under reduced pressure. Subsequently, 34 kg. of vinyl chloride monomer was introduced thereto and the temperature was elevated to 50° C. At the same time, total 0.0033% by weight of hydrogen peroxide based on vinyl chloride monomer and total 1.0 equivalent mole of rongalite based on a mole of hydrogen peroxide used were continuously added thereto through separate inlets respectively at constant rates throughout an entire polymerization time. Further, total 0.3% by weight of each emulsifier as listed in Table 1 based on the charged vinyl chloride monomer was continuously added thereto from the time at which the conversion reached 13.5% till the end of polymerization. The polymerization was discontinued when a polymerization pressure dropped by 1 kg./cm.$^2$ than the saturated vapor pressure of vinyl chloride at 50° C., and unreacted monomer was recovered therefrom. The average degree of polymerization and average diameter of unit particles of thus obtained polymer latex obtained when each emulsifier was used are also shown in Table 1.

TABLE 1

| Polymer latex | Kind of emulsifier used in polymerization | Average degree of polymerization | Average diameter of unit particles, micron |
|---|---|---|---|
| A | Sodium n-dodecyl sulfate | 1500 | 0.78 |
| B | Sodium 2,4,6,8-tetramethylnonyl sulfate (emulsifier of the present invention). | 1480 | 0.74 |
| C | Sodium β-2,4,6,8-tetramethylnonyl-oxy-ethyl sulfate (emulsifier of the present invention). | 1510 | 0.74 |

To the thus obtained polymer latexes A, B and C were added 0.5% by weight of sodium n-dodecyl sulfate or the same emulsifiers as used in each polymerization on the basis of vinyl chloride polymer as a post polymerization emulsifier respectively, and the polymer latexes were spray-dried that the same conditions respectively and vinyl chloride polymer resins for paste were obtained by pulversizing the spray-dried products. The air release properties of the plastisols prepared from these resins are given in Table 2.

TABLE 2

| Polymer latex | Resin | Kind of emulsifier used in post polymerization | Air releasability at 1 standing |
|---|---|---|---|
| A | a | Sodium n-dodecyl sulfate ester | 17 |
| B | b-1 | do | 7 |
|   | b-2 | Sodium 2,4,6,8-tetramethylnonyl sulfate (emulsifier of the present invention) | 2 |
| C | c-1 | Sodium n-dodecyl sulfate | 5 |
|   | c-2 | Sodium β-2,4,6,8-tetramethylnonyloxy-ethyl sulfate (emulsifier of the present invention) | 1 |

[1] A method for determining an air releasability at standing is given as follows: vinyl chloride polymer resin for paste (50 g.), plasticizer di(2-ethylhexyl) phthlate: 25 g.) and Mark BB (stabilizer of liquid complex of Cd–Ba–Zn system: 1 g.) are mixed and prepared into a paste. The resulting paste is transferred into a conical paper cup having a base diameter of about 8 cm. and a height of about 12 cm. and left standing at room temperature for 4 hours. After 4 hours, the tip of the cup is cut away, through which a proper amount of paste is allowed to flow over a glass plate, and the paste on the glass plate is scraped up to a thickness of 0.25 mm. by a scraper and heated in a gear oven of 177° C. for 10 minutes to make the paste be gelled. Number of air foams contained in each of three circles in a diameter of 0.5 mm. at any three points on the thus obtained film is counted and an average foam number of these three is given as the air releasability at standing. The smaller the foam number, the better the air releasability.

It is obvious from Tables 1 and 2 that the air releasabilities of the resins (b–1, c–1) or b–2, c–2) obtained by using sodium branched alkyl sulfate or sodium β-branched alkoxyethyl sulfate as a polymerization emulsifier or both polymerization emulsifier and post polymerization emulsifier are superior to that of resin (a) obtained by using a well-known sodium normal alkyl sulfate as both polymerization emulsifier and post polymerization emulsifier.

EXAMPLE 2

Vinyl chloride polymer latex D was obtained by carrying out the polymerization in the same manner as in Example 1, except that 0.95 kg. of vinyl chloride polymer latex having an average diameter of unit particles of 0.3 micron as a seed polymer is used as the vinyl chloride polymer and sodium salt of straight dodecyl sulfate ester as an emulsifier.

The average degree of polymerization and the average diameter of unit particles of the thus obtained polymer were 1530 and 0.96 micron respectively.

To the polymer latex D were added 0.5% by weight of each of various emulsifiers shown in Table 3 as the post polymerization emulsifier on the basis of vinyl chloride polymer, and the thus added latex was spray-dried and pulverized, whereby vinyl chloride polymer resin for paste was obtained. The air releasabilities at standing of plastisols prepared from these resins in the same manner as in Example 1 are given in Table 3. As is clear from Table 3, the air releasabilities of the resin (d–4 to d–8) obtained by using the present emulsifier are superior to those of the polymers obtained by using the well known sodium salt of straight alkyl sulfuric acid as the post polymerization emulsifier.

TABLE 3

| Polymer | Kind of emulsifier used in post polymerization | Air releasability at standing |
|---|---|---|
| d–1 | Sodium n-dodecyl sulfate | 30 |
| d–2 | Sodium β-n-dodecyloxyethyl sulfate | 25 |
| d–3 | Sodium n-tetradecanyl sulfate | 21 |
| d–4 | Sodium 2,4,6-trimethylheptyl sulfate | 3 |
| d–5 | Ammonium 2,4,6-trimethylheptyl sulfate | 3 |
| d–6 | Sodium 2,4,6,8-tetramethylnonyl sulfate | 3 |
| d–7 | Sodium β-2,4,6,8-tetramethylnonyloxyethyl sulfate (emulsifier of the present invention) | 3 |
| d–8 | Ammonium β-2,4,6,8-tetramethylnonyloxyethyl sulfate (emulsifier of the present invention.) | 3 |

We claim:

1. In a process for preparing a vinyl chloride polymer, by emulsion-polymerizing monomer of vinyl chloride or vinyl chloride with other ethylenically unsaturated compounds in the presence of a polymerization emulsifier in a polymerization step, mixing a latex of the resulting polymer with a post polymerization emulsifier in a mixing step, and drying the mixed latex, an improvement which comprises using an alkali metal salt or ammonium salt or alkyl sulfuric acids as represented by the following formula:

$$R(O-CH_2-CH_2)_nOSO_3M$$

wherein M is a member selected from the group consisting of alkali metal and ammonium group, R is an alkyl group having 7 to 20 carbon atoms which does not contain more than 2 adjacent methylene groups, and $n$ is an integer of 0 to 2, as an emulsifier in at least one step of the polymerization step or the mixing step.

2. An improvement according to claim 1, wherein 0.1 to 1% by weight of the emulsifier is used in the polymerization step on the basis of the monomer.

3. An improvement according to claim 1, wherein 0.1 to 2.0% by weight of the emulsifier is used in the mixing step on the basis of the polymer in the obtained latex.

4. An improvement according to claim 1, wherein 0.1 to 1.0% by weight of the emulsifier is used in the polymerization step on the basis of the monomer and 0.1 to 2.0% by weight of the emulsifier is used in the mixing step on the basis of the polymer in the obtained latex.

5. An improvement according to claim 1, wherein the alkali metal salts or ammonium salts of the alkyl sulfuric acids is sodium 2,4,6,8-tetramethylnonyl sulfate, sodium β-2,4,6,8-tetramethylnonyloxyethyl sulfate, sodium 2,4,6-trimethylheptyl sulfate, ammonium 2,4,6-trimethylheptyl sulfate or ammonium β-2,4,6,8-tetramethylnonyloxyethyl sulfate.

6. A vinyl chloride polymer obtained according to an improved process as claimed in claim 1.

References Cited

UNITED STATES PATENTS 3,332,918   7/1967   Benetta et al. _____ 260—92.8

JOSEPH L. SCHOFER, Primary Examiner

J. A. DONAHUE, JR., Assistant Examiner

U.S. Cl. X.R.

260—85.5, 86.3, 87.1, 87.5, 87.7